United States Patent
Salminen et al.

(10) Patent No.: US 7,269,449 B2
(45) Date of Patent: Sep. 11, 2007

(54) USER EXCHANGEABLE MOBILE PHONE KEYPAD

(75) Inventors: Seppo Salminen, Turku (FI); Bror Svarfvar, Kaarina (FI)

(73) Assignee: Nokia Corporation, Espoo (FI)

( * ) Notice: Subject to any disclaimer, the term of this patent is extended or adjusted under 35 U.S.C. 154(b) by 696 days.

(21) Appl. No.: 09/998,849

(22) Filed: Oct. 24, 2001

(65) Prior Publication Data

US 2003/0078014 A1    Apr. 24, 2003

(51) Int. Cl.
    *H04B 1/38*    (2006.01)
(52) U.S. Cl. ............... 455/575.1; 455/575.3; 455/575.4; 455/575.6
(58) Field of Classification Search .......... 455/90.3, 455/566, 575.1, 575.8, 566.1, 575.3, 575.4, 455/575.6
    See application file for complete search history.

(56) References Cited

U.S. PATENT DOCUMENTS

| | | | | |
|---|---|---|---|---|
| 4,954,823 A * | 9/1990 | Binstead | ................. | 341/26 |
| 5,337,346 A | 8/1994 | Uchikura | ................. | 379/58 |
| 5,365,570 A * | 11/1994 | Boubelik | ................. | 455/565 |
| 5,576,981 A * | 11/1996 | Parker et al. | ................. | 708/140 |
| 5,584,054 A | 12/1996 | Tyneski et al. | ................. | 455/89 |
| 5,646,649 A | 7/1997 | Iwata et al. | ................. | 345/173 |
| 5,848,152 A | 12/1998 | Slipy et al. | ................. | 379/433 |
| 5,880,389 A * | 3/1999 | Muramatsu | ................. | 84/615 |
| 5,898,933 A * | 4/1999 | Kaschke | ................. | 455/575.7 |
| 5,911,121 A | 6/1999 | Andrews | ................. | 455/418 |
| 5,982,881 A | 11/1999 | Mischenko | ................. | 379/433 |
| 6,038,313 A * | 3/2000 | Collins | ................. | 379/433.07 |
| 6,038,457 A * | 3/2000 | Barkat | ................. | 455/556.1 |
| 6,040,822 A * | 3/2000 | Decker | ................. | 345/168 |
| 6,047,196 A | 4/2000 | Makela et al. | ................. | 455/556 |
| 6,118,986 A * | 9/2000 | Harris et al. | ................. | 455/575.3 |
| 6,128,475 A | 10/2000 | Wicks et al. | ................. | 455/90 |
| 6,188,917 B1 | 2/2001 | Laureanti | ................. | 455/573 |
| 6,205,343 B1 * | 3/2001 | Montgomery, Jr. | ................. | 455/574 |
| 6,266,234 B1 * | 7/2001 | Leman | ................. | 361/680 |
| 6,282,436 B1 | 8/2001 | Crisp | ................. | 455/575 |
| 6,362,976 B1 * | 3/2002 | Winters et al. | ................. | 361/814 |
| 6,385,463 B1 * | 5/2002 | Lieberman et al. | ................. | 455/557 |
| 6,532,152 B1 * | 3/2003 | White et al. | ................. | 361/692 |
| 6,748,248 B1 * | 6/2004 | Pan et al. | ................. | 455/575.1 |
| 6,794,992 B1 * | 9/2004 | Rogers | ................. | 340/825.25 |
| 2001/0015760 A1 * | 8/2001 | Fellegara et al. | ................. | 348/333.01 |

(Continued)

FOREIGN PATENT DOCUMENTS

DE        19934707 C1    2/2001

(Continued)

*Primary Examiner*—Matthew Anderson
*Assistant Examiner*—Tuan Pham
(74) *Attorney, Agent, or Firm*—Perman & Green, LLP (57) ABSTRACT

A handset having a housing having a display and first keypad. The first keypad is removably coupled to the housing. Circuitry is provided within the housing. The circuitry is adapted to interface with the display and the first keypad. A second keypad is provided. The second keypad is exchangeable with the first keypad. The second keypad is adapted to replace the first keypad on the housing when the first keypad is removed from the housing.

20 Claims, 6 Drawing Sheets

U.S. PATENT DOCUMENTS

| | | | |
|---|---|---|---|
| 2002/0132640 A1* | 9/2002 | Hyun et al. | 455/557 |
| 2002/0168947 A1* | 11/2002 | Lemley | 455/90 |
| 2003/0036362 A1* | 2/2003 | Buesseler et al. | 455/90 |
| 2004/0132492 A1* | 7/2004 | Engstrom et al. | 455/556.2 |
| 2004/0214559 A1* | 10/2004 | Date et al. | 455/418 |

FOREIGN PATENT DOCUMENTS

| | | |
|---|---|---|
| DE | 10018375 A1 | 10/2001 |
| EP | 1091540 A2 | 4/2001 |
| GB | 2357929 A | 7/2001 |

* cited by examiner

USER EXCHANGEABLE MOBILE PHONE KEYPAD

BACKGROUND OF THE INVENTION

1. Field of the Invention

The present invention relates to a mobile phone and, more particularly, to a user exchangeable keypad for a mobile phone.

2. Prior Art

Mobile phones with different user interfaces are known in the mobile phone art. For example, U.S. Pat. No. 6,047,196 discloses a mobile station which comprises two separate user interfaces and an outer covering which can be unfolded. Cellular telephones typically include a user interface, such as a keypad, microphone, speaker, keypad and/or a display. The typical arrangement where there is a single user interface or a plurality of user interfaces makes it difficult to accommodate personalization or a large number of applications where the applications are user interface or keypad specific. This difficulty arises because a large amount of buttons need to be provided in order to accommodate a wide variety of applications. This large amount of buttons may become frustrating for the user of an application where only a few keys are desired and the user presses the wrong keys. Alternately, this large amount of buttons may be confusing for children or handicapped persons. In addition, when there is a desire to personalize the keypad or user interface in areas such as the number, function, appearance, shape or otherwise of the keys, the typical scheme where there is a single user interface or a plurality of user interfaces can not accommodate such personalization. Accordingly, there is a desire to provide a keypad which is easily personalized and can easily be configured.

SUMMARY OF THE INVENTION

In accordance with one embodiment of the present invention, a handset is provided. The handset has a housing having a display and first keypad. The first keypad is removably coupled to the housing. Circuitry is provided within the housing. The circuitry is adapted to interface with the display and the first keypad. A second keypad is provided. The second keypad is exchangeable with the first keypad. The second keypad is adapted to replace the first keypad on the housing when the first keypad is removed from the housing.

In accordance with another embodiment of the present invention, a handset is provided. The cordless telephone handset has a housing. The housing has a cordless telephone display and a telephone keypad. Telephone circuitry is provided within the housing. The telephone circuitry is adapted to interface with the telephone keypad and the cordless telephone display. A first keypad is removably coupled to the housing. A second keypad is provided. The second keypad is exchangeable with the first keypad. The second keypad is adapted to be removably coupled to the housing when the first keypad is removed from the housing.

In accordance with a method of the present invention, a method of exchanging a keypad of a cordless handset is provided having a first step of providing a housing having a display and first keypad where the first keypad is removable from the housing. A second keypad is then provided where the second keypad is exchangeable with the first keypad. The first keypad is removed from the housing and replaced with the second keypad on the housing.

In accordance with another embodiment of the present invention, a handheld electronic device is provided. The handheld electronic device has a housing with circuitry disposed in the housing. The circuitry includes a controller programmed to operate the circuitry in accordance with a predetermined characteristic of the electronic device. A user interface is mounted to the housing for interfacing with the circuitry. The user interface is selected from a number of different user interfaces having different predetermined interface characteristics.

In accordance with another embodiment of the present invention a handheld electronic device is provided. The handheld electronic device has a housing with circuitry disposed in the housing. The circuitry includes a controller programmed to operate the circuitry and provide the device with multiple applications. An interchangeable user interface is removably mounted to the housing for interfacing with the circuitry. The user interface is interchangeable with a number of different interchangeable user interfaces with different predetermined characteristics.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
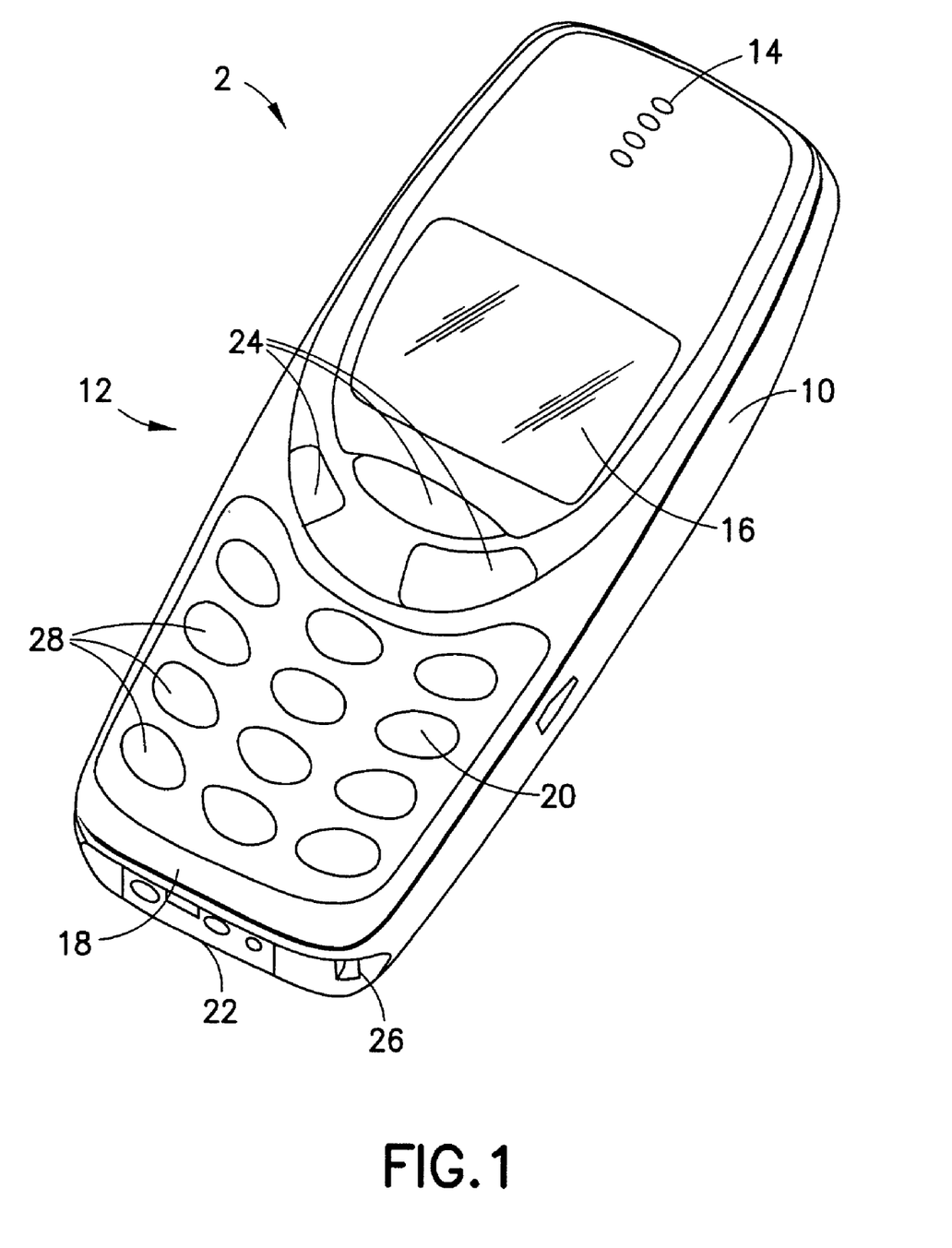
FIG. 1 is an isometric view of a first embodiment cordless telephone handset incorporating features of the present invention.

Referring to FIG. 1, there is shown, an isometric view of a first embodiment cordless telephone handset 2 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

Cordless telephone handset 2, in the embodiment shown, is a mobile cellular communication device. However, in alternate embodiments, the apparatus could be a mobile radio communications device, a cordless telephone device, a cordless handset or other suitable device. Cordless telephone handset 2 generally comprises housing 10 with user interface 12. The housing 10 of the phone 2 typically contains a speaker interface 14, a display interface 16, a microphone interface 18, a numerical keypad interface 20, power interface 22, keys 24 and circuitry 26. The circuitry 26 may include a controller on processor 26C. In the embodiment shown, keypad 20 may be removable from housing 10 and replaceable with a second keypad for the same or different application. The description above is merely intended to be exemplary. More or less features could also be provided. For example, an antenna or a battery may be disposed within or outside of housing 10. As a further example, Circuitry 26 may be a cordless handheld device that includes interface capability and applications programmed in controller 26C such as for games, data loggers, personal data analysis, or other applications that may port to a handheld device and may be independently be operable or otherwise. As further examples, features such as belt clips, headset connections, docking interfaces, status indicators, lanyard connections, labels, network connections, recording capability, additional user interfaces, or otherwise may be provided.

Housing 10 is shown as molded polymer plastic shell. Housing 10 may alternately be made as or from a composite material(s), from metal or other suitable material or method. Keys 24 are provided on housing 8 for features such as power on and off, menu access to allow the user to change modes of operation, or otherwise. Speaker interface 14 may allow the user to hear communications from third parties and may be used as a tone or sound indicator to determine that a key has been pressed or to indicate a status condition such as weak signal, busy signal or otherwise. Display interface 16 may allow the user to see phone status such as number called, date, directory or may alternately act as a interface for text or images such as for mail or internet communications, games or otherwise. Microphone interface 18 is provided to allow the user to speak or enter sound. Keypad 20 may be removable from housing 10 and replaceable with a second keypad for the same or different application, such as for games or otherwise. This allows the user to easily change keypad 20 with a second changeable keypad in order to change the color, appearance, features, applications or other characteristics of the cordless handset 2. Keypad 20 is shown as a unitary molded, laminated or otherwise manufactured structure and may be transparent or semitransparent in order to allow illumination of the keys. Keypad 20 may have a number of depressible keys 28 within the keypad area. Keypad 20 may incorporate a membrane type keypad such as disclosed in U.S. Pat. No. 6,180,895, U.S. application Ser. No. 09/847,140 filed May 2, 2001, PCT/BG01/02633 filed Jun. 15, 2001 or PCT Publication WO 97/32423 published Sep. 4, 1997, all of which are incorporated by reference in their entirety. The keypad may incorporate a resistive keyboard such as that disclosed in European Patent Publication Number EP 695 041 filed Jul. 26, 1994, U.S. application Ser. No. 09/453,648 filed Dec. 3, 1999 and U.S. application Ser. No. 09/761,970 filed Jan. 17, 2001, all of which are incorporated by reference in their entirety. Keypad 20 is shown as being exemplary and may alternately incorporate any of a number of conventional keypad connection approaches such as discrete interconnects, multiplexed interconnects, touch contacts such as electrostatic or optical contacts or otherwise. Power interface 22 is provided to allow access to power for operation of handheld device 2 or for charging batteries. Exemplary power interface 22 is shown as a contact based interface but may alternately be a inductive based power interface, optical based power interface or otherwise. Circuitry 26 is contained within housing 10. The circuitry 26 may include transmit and receive circuitry for radio communications, audio processing circuits for coding and decoding voice communications, and a control circuit for controlling the operation of the cellular phone. The circuitry 26 may further include a speaker, a display, keypad interface, a microphone and a power interface. Circuitry 26 may be a single arrangement or multiple circuits and may further include memory, control processor 26C, input and output circuitry and interfaces or otherwise. The description above is merely intended to be exemplary. More or less features could also be provided. For example, keys 24 could be incorporated into keypad interface 20 or not provided. As a further example, an antenna or a battery may be disposed within or outside of housing 10. As a further example, more or less keys or larger or smaller keys or different sized keys may be provided on keypad 20. As a further example, processor 26C may provide the circuitry 26 with interface capability and applications such as for games, data loggers, personal data analysis, or other applications.

Figure 2A:
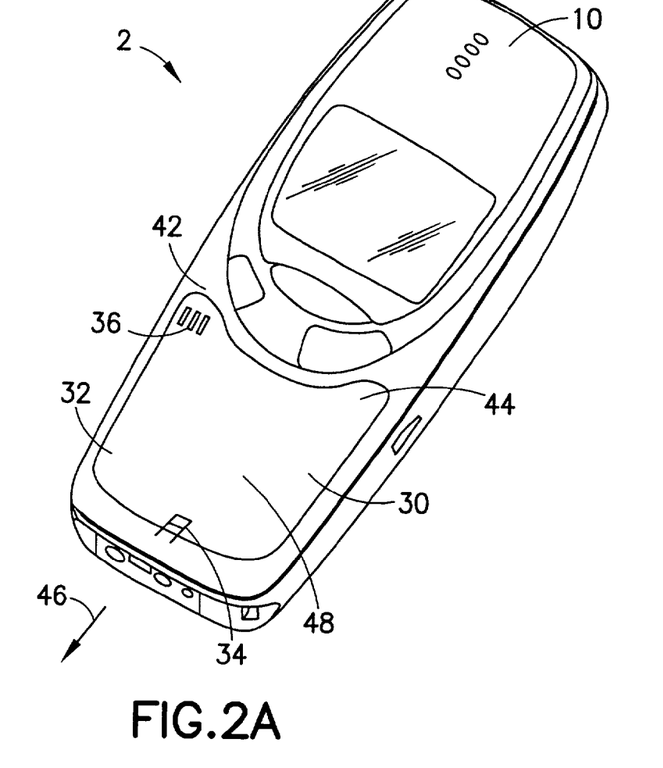
FIG. 2A is an isometric view of the cordless telephone handset in FIG. 1 shown in a second configuration.
Figure 2B:
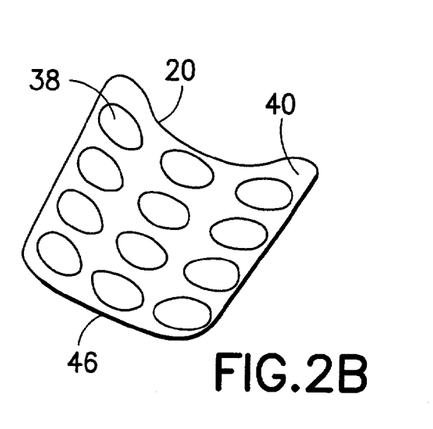
FIG. 2B is another isometric view of a keypad of the cordless telephone handset in FIG. 1.
Figure 2C:
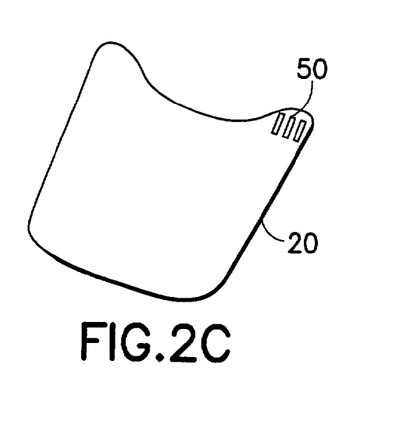
FIG. 2C is another isometric view of the keypad of the cordless telephone handset in FIG. 1.

Referring now to FIGS. 2A & 2B, there is shown, a view of cordless handset 2 incorporating features of the present invention. Cordless telephone handset 2 is shown with keypad 20 removed at keypad interface 30. Keypad interface 30 has a recess 32, latch 34, interconnect 36 and illumination source 48. Recess 32 accepts keypad 20 and captures top edges 38 and 40 with catch areas 42 and 44 respectively. Alternately, keypad may be captured in housing 20 by other conventional approaches or otherwise. Keypad 20 may be removably coupled to housing 10 by a conventional latch arrangement 34 which may be received in latch area 46 of keypad 20. To replace keypad 20, top edges 38 and 40 are engaged in catch areas 42 and 44 respectively and keypad 20 snapped into spring loaded latch 34. To remove keypad 20, latch 34 is drawn away from keypad 20 in direction 46 and top edges 38 and 40 disengaged from catch areas 42 and 44 respectively and keypad 20 removed. In an alternate embodiment, keypad 20 may be removably coupled to housing 10 by magnetic attraction, by conventional coupling, conventional fasteners or by any suitable coupling approach. In this manner, keypad 20 may easily be removed and replaced with a second changeable keypad by the phone user. Interconnect 36 is shown for example as a three pin interconnect interface. Referring also to FIG. 2C, there is shown the backside of keypad 20 having interconnect 50 which mates with interconnect 42 when keypad 20 is coupled to housing 10. In the event keypad 20 is a resistive keypad, three conductive interconnects may support, for example, twenty keys or less and additional two status keys. Alternately, in the event keypad 20 is a resistive keypad, four conductive interconnects may be used to support, for example, a full query keyboard. In alternate embodiments, more or less interconnects could be provided. In alternate embodiments different types of interconnects could be provided, such as optical, inductive or otherwise. In alternate embodiments, interconnect 42 may have more or less conductors than interconnect 50. Illumination source 48 is used to illuminate the keypad 20. The description above is merely intended to be exemplary. More or less features could also be provided.

Figure 3A:
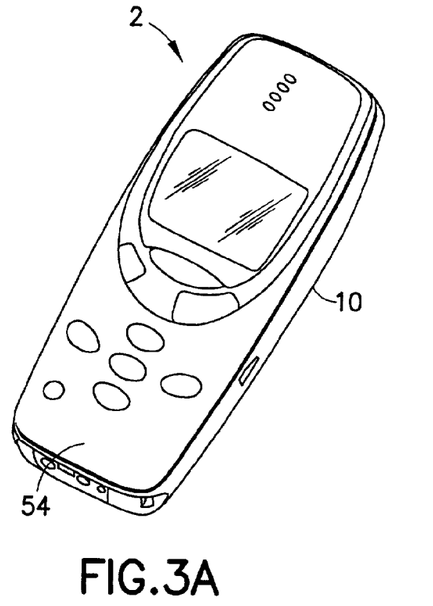
FIG. 3A is an isometric view of the cordless telephone handset in FIG. 1 shown in another configuration.

Referring now to FIG. 3A, there is shown the cordless handset 2 according to the present invention with a different, second keypad 54 attached. Keypad 54 incorporates features similar to that of keypad 20 and may be removably coupled to housing 10 in a manner similar to that of keypad 20. In this embodiment, keypad 54 is shown with six keys, an arrangement that may be used for applications such as games. Keypad 54 may incorporate a resistive keyboard where the resistance characteristics are different, for example higher, lower or otherwise different than for keypad 20. In an alternate embodiment, any suitable method of detection of the keypad type could be used such as detecting any electrical optical or physical characteristic of keypad 54 that is different than keypad 20 or otherwise. With different resistance characteristics, circuitry 26 may detect the type of keypad attached to housing 10 and adjust the application appropriately. Such a change, for example, could be changing from a cordless telephone application for keypad 20 to a game application for keypad 54. The description above is merely intended to be exemplary. More or less features could also be provided. For example, more or less keys or larger or smaller keys or different sized keys may be provided on keypad 54.

Figure 3B:
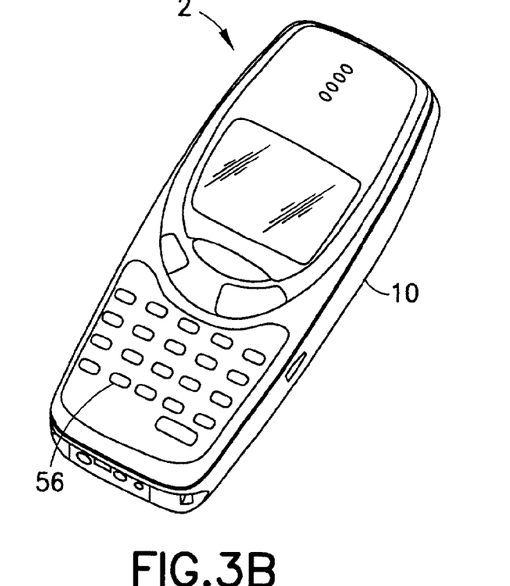
FIG. 3B is an isometric view of the cordless telephone handset in FIG. 1 shown in another configuration.

Referring now to FIG. 3B, there is shown the cordless handset 2 according to the present invention with a different, second keypad 56 attached. Keypad 56 incorporates features similar to that of keypad 20 and may be removably coupled to housing 10 in a manner similar to that of keypad 20. In this embodiment, keypad 56 is shown with 21 keys, an arrangement that may be used for applications such as calculators. Keypad 56 may incorporate a resistive keyboard where the resistance characteristics are different, for example higher, lower or otherwise different than for keypad 20. In an alternate embodiment, any suitable method of detection of the keypad type could be used such as detecting any electrical optical or physical characteristic of keypad 56 that is different than keypad 20 or otherwise. With different resistance characteristics, circuitry 26 may detect the type of keypad attached to housing 10 and adjust the application appropriately. Such a change, for example, could be changing from a cordless telephone application for keypad 20 to a calculator application for keypad 56. The description above is merely intended to be exemplary. More or less features could also be provided. For example, more or less keys or larger or smaller keys or different sized keys may be provided on keypad 56.

Figure 3C:
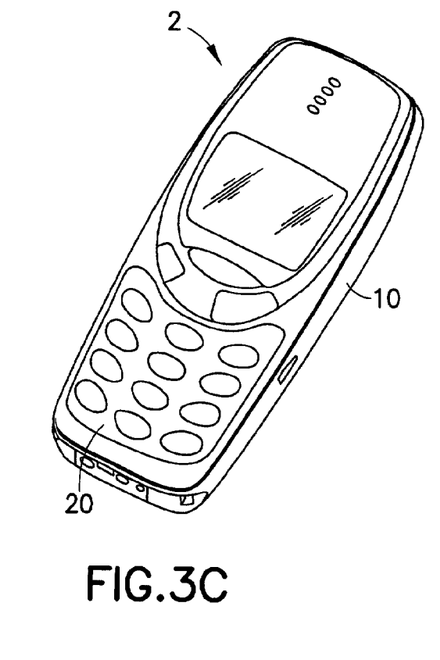
FIG. 3C is an isometric view of the cordless telephone handset in yet another configuration.

Referring now to FIG. 3C, there is shown the cordless handset 2 according to the present invention with keypad 20 re-attached.

Figure 3D:
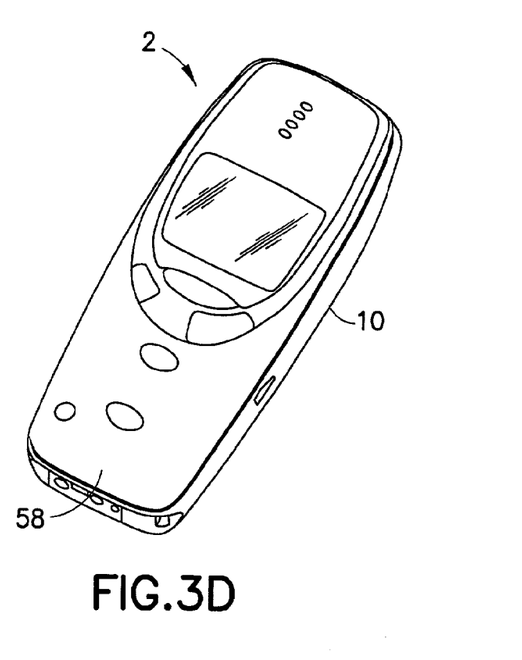
FIG. 3D is an isometric view of the cordless telephone handset in still yet another configuration.

Referring now to FIG. 3D, there is shown the cordless handset 2 according to the present invention with a different, second keypad 58 attached. Keypad 58 incorporates features similar to that of keypad 20 and may be removably coupled to housing 10 in a manner similar to that of keypad 20. In this embodiment, keypad 58 is shown with 3 keys, an arrangement that may be used for applications such as for children where a single number for parents or emergencies may be programmed into handset 2 and correspond to the larger keys. Keypad 58 may incorporate a resistive keyboard where the resistance characteristics are different, for example higher, lower or otherwise different than for keypad 20. In an alternate embodiment, any suitable method of detection of the keypad type could be used such as detecting any electrical optical or physical characteristic of keypad 56 that is different than keypad 20 or otherwise. With different resistance characteristics, circuitry 26 may detect the type of keypad attached to housing 10 and adjust the application appropriately. Such a change, for example, could be changing from a cordless telephone application for keypad 20 to a children's application for keypad 58. The description above is merely intended to be exemplary. More or less features could also be provided. For example, more or less keys or larger or smaller keys or different sized keys may be provided on keypad 58.

Figures 4A, 4B:
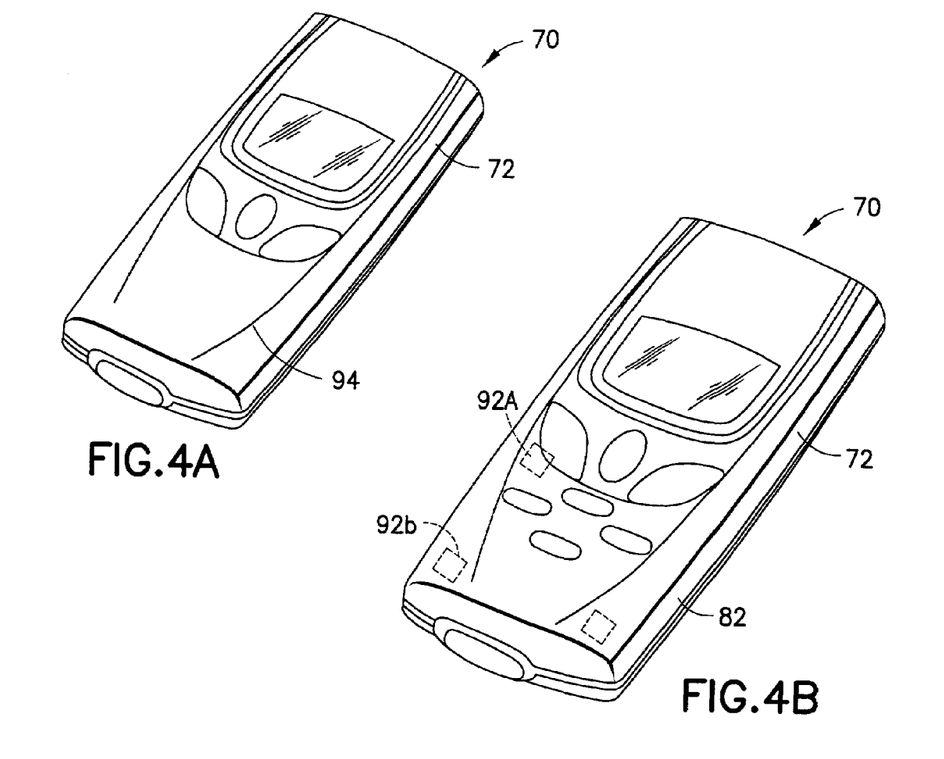
FIG. 4A is an isometric view of a second embodiment cordless telephone handset incorporating features of the present invention.
FIG. 4B is an isometric view of the cordless telephone handset in FIG. 4A with a different configuration.
Figures 4C, 4E:
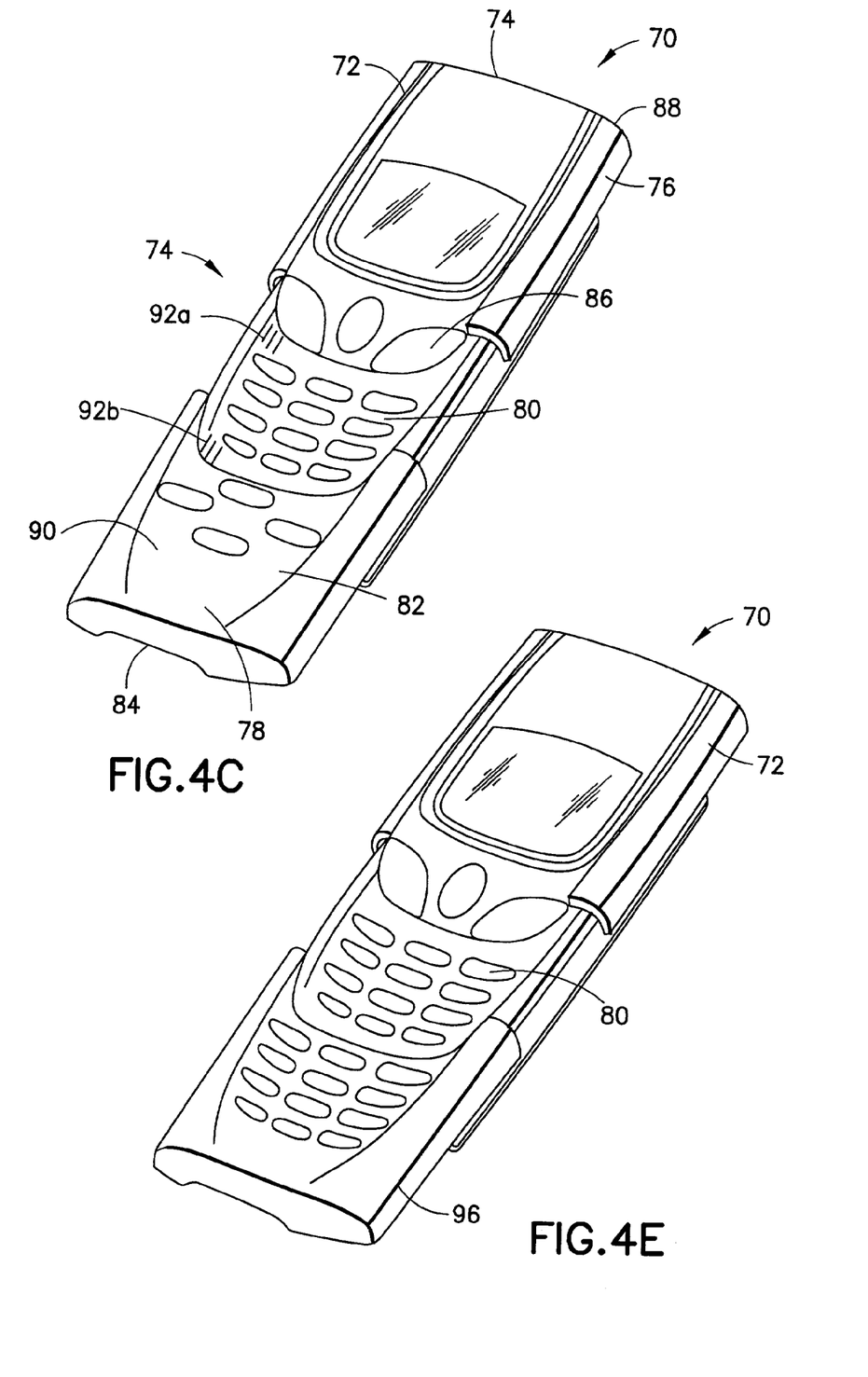
FIG. 4C is an isometric view of the cordless telephone handset in FIG. 4A with another configuration.
FIG. 4E is an isometric view of the cordless telephone handset in FIG. 4A with yet another configuration.

Referring now to FIGS. 4B and 4C there is shown an isometric view of a second embodiment cordless telephone handset 70 incorporating features of the present invention. Cordless telephone handset 70, in the embodiment shown, is a mobile cellular communication device and incorporates many of the features of the first embodiment cordless telephone handset 2. However, in alternate embodiments, the apparatus could be a mobile radio communications device, a cordless telephone device, a cordless handset or other suitable device. Cordless telephone handset 70 generally comprises housing 72 with user interface 74. The housing 72 of the phone 70 typically contains a speaker interface 74, a display interface 76, a microphone interface 78, a telephone keypad interface 80, a user keypad 82, power interface 84, keys 86 and circuitry 88. In the embodiment shown, user keypad 82 may be removable from housing 72 and replaceable with a second user keypad for the same or different application. In the embodiment shown, the user keypad 82 is slidably coupled to housing 72 in a manner similar to that shown in U.S. Pat. No. 6,282,436 which is hereby incorporated by reference in its entirety. The description above is merely intended to be exemplary. More or less features could also be provided. For example, more or less keys could be provided. As a further example, user keypad 82 may be hinged to housing 72 or otherwise removable coupled to housing 72.

User keypad 82 may be removable from housing 72 and replaceable with a second keypad for the same or different application, such as for games or otherwise. This allows the user to easily change user keypad 82 with a second changeable keypad in order to change the color, appearance, features, applications or other characteristics of the cordless handset 70. Such a changeable keypad, is shown in FIG. 4A as blank keypad 94. In this embodiment, keypad 82 is shown with four keys, an arrangement that may be used for applications such as games. In alternate embodiments, more or less keys may be provided. Keypad 82 is shown as a unitary molded structure and may be transparent or semi-transparent in order to allow illumination of the keys. Keypad 82 may have a number of depressible keys 90 within the keypad area. Keypad 82 may incorporate a membrane type keypad or a resistive keyboard. Keypad 82 is shown as being exemplary and may alternately incorporate any of a number of conventional keypad connection approaches such as discrete interconnects, multiplexed interconnects, touch contacts such as electrostatic or optical contacts or otherwise without departing from the invention. Cordless telephone handset 70 is shown in FIG. 4C with user keypad 82 slid to expose telephone keypad 80. In this position, telephone keypad 80 may be active and user keypad 82 may be inactive, or they both may be active. In the closed position shown in FIG. 4B, user keypad 82 may be active. Interconnect 92a mates with user keypad 82 when user keypad is in the closed position where telephone keypad 80 is covered, but keypad 82 may also mate with interconnect 92b when the user keypad is in the open position. Interconnects 92a and 92b are shown as three pin interconnect interfaces. In the event keypad 82 is a resistive keypad, three or four conductive interconnects may support, for example, twenty keys or less and additional two status keys. Alternately, in the event keypad 82 is a resistive keypad, four or five conductive interconnects may be used to support, for example, a full querty keyboard. In alternate embodiments, more or less interconnects could be provided. In alternate embodiments different types of interconnects could be provided, such as optical, inductive or otherwise. In alternate embodiments, interconnect 92 may have more or less conductors than the interconnect on user keypad 82. In an alternate embodiment, more or less keys may be provided on keypad 82 and/or keypad 80. In an alternate embodiment, keypad 82 may always be active independent of position.

Figure 4D:
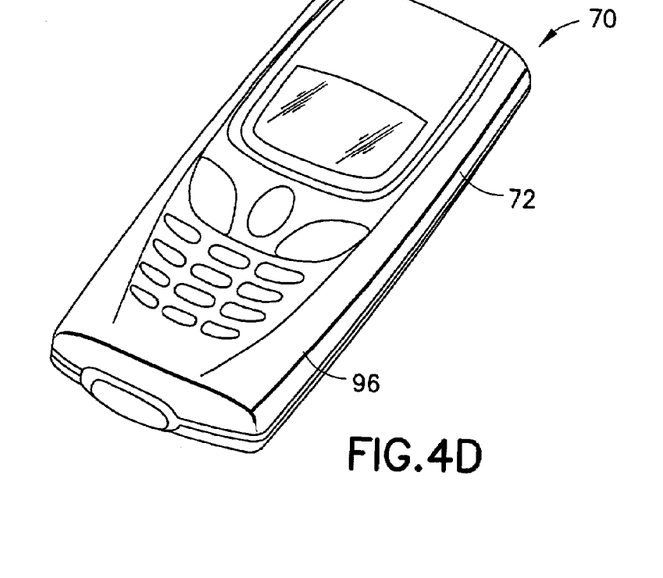
FIG. 4D is an isometric view of the cordless telephone handset in FIG. 4A with still another configuration.

Referring now to FIGS. 4D and 4E, there is shown the cordless handset 70 according to the present invention with a different, second keypad 96 attached. Keypad 96 incorporates features similar to that of keypad 82 and may be removably coupled to housing 10 in a manner similar to that of keypad 82. In this embodiment, keypad 96 is shown with 12 keys, an arrangement that may be used for applications such as calculators. Keypad 96 may incorporate a resistive keyboard where the resistance characteristics are different, for example higher, lower or otherwise different than for keypad 82. In an alternate embodiment, any suitable method of detection of the keypad type could be used such as detecting any electrical optical or physical characteristic of keypad 96 that is different than keypad 82 or otherwise. With different resistance characteristics, circuitry 88 may detect the type of keypad attached to housing 72 and adjust the application appropriately. Such a change, for example, could be changing from a cordless telephone application for keypad 82 to a calculator application for keypad 96. The description above is merely intended to be exemplary. More or less features could also be provided. For example, more or less keys or larger or smaller keys or different sized keys may be provided on keypad 96.

Figure 5A:
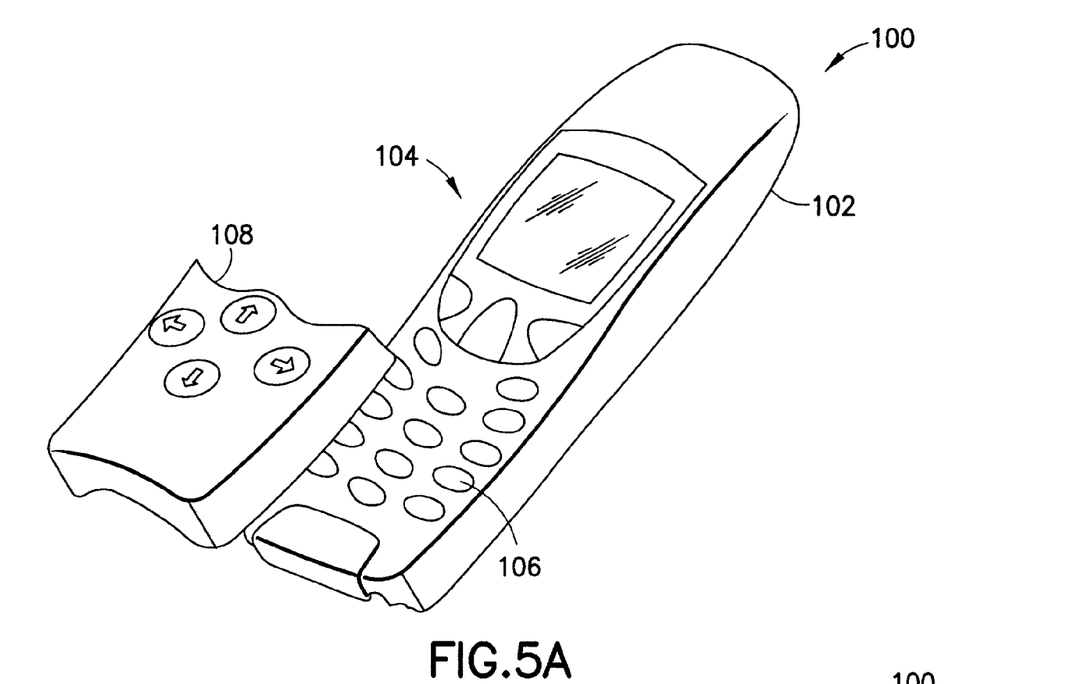
FIG. 5A is an isometric view of a cordless telephone handset.
Figure 5B:
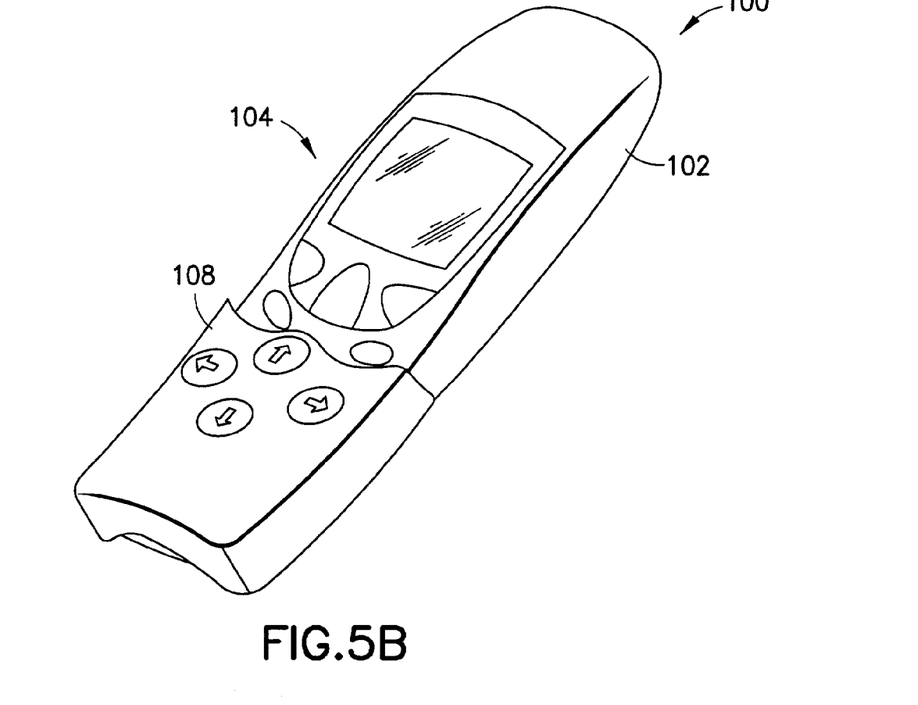
FIG. 5B is an isometric view of a cordless telephone handset.

Referring now to FIGS. 5A and 5B there is shown an isometric view of a third embodiment cordless telephone handset 100 incorporating features of the present invention. Cordless telephone handset 100, in the embodiment shown, is a mobile cellular communication device and incorporates many of the features of the first embodiment cordless telephone handset 2 and the second embodiment handheld device 70. Cordless telephone handset 100 may incorporate features of the handset disclosed in Finland Application Number 20002244, filed Oct. 11, 2000 and the corresponding United States Application filed Oct. 10, 2001 which is hereby incorporated by reference in it's entirety. Cordless telephone handset 100 generally comprises housing 102 with user interface 104. The housing 100 also contains a telephone accessory fastening cavity interface 106. In the embodiment shown, a user keypad 108 may be placed on top of housing 102 and locked into position by utilizing the accessory fastening cavity for the same or different application without removing the underlying keypad 106. In the embodiment shown, the user keypad 108 is removably snapped onto housing 102. The description above is merely intended to be exemplary. More or less features could also be provided. For example, more or less keys could be provided.

User keypad 108 may be removable from housing 102 and replaceable with a second keypad for the same or different application, such as for games or otherwise. This allows the user to easily change user keypad 108 with a second changeable keypad in order to change the color, appearance, features, applications or other characteristics of the cordless handset 100. Such a changeable keypad could be a blank keypad 94 or otherwise. In this embodiment, keypad 108 is shown with four keys, an arrangement that may be used for applications such as games. In alternate embodiments, more or less keys may be provided. Keypad 108 is shown as a unitary molded, laminated or otherwise manufactured structure and may be transparent or semitransparent in order to allow illumination of the keys. Keypad 108 may have a number of depressible keys within the keypad area. Keypad 108 may incorporate a membrane type keypad or a resistive keyboard. In an alternate embodiment, keypad 108 may simply allow mechanical coupling of the keys on keypad 108 to those keys on telephone keypad 106 when keypad 108 is coupled to housing 102. Keypad 108 is shown as being exemplary and may alternately incorporate any of a number of conventional keypad connection approaches such as discrete interconnects, multiplexed interconnects, touch contacts such as electrostatic or optical contacts or otherwise without departing from the invention. In the instance when user keypad 108 is removed, telephone keypad 106 may be active and user keypad 108 may be inactive. In the coupled position shown in FIG. 5B, user keypad 108 may be active. Keypad 108 may interconnect with housing 100 similar to that of cordless devices 70 and 2 in the previous embodiments. In an alternate embodiment, keypad 108 may simply allow mechanical coupling of the keys on keypad 108 to those keys on telephone keypad 106 when keypad 108 is coupled to housing 102. In alternate embodiments, more or less interconnects could be provided. In alternate embodiments different types of interconnects could be provided, such as optical, inductive or otherwise. In alternate embodiments, the interconnect may have more or less conductors than the interconnect on user keypad 108. In an alternate embodiment, more or less keys may be provided on keypad 108 and/or keypad 106. The description above is merely intended to be exemplary. More or less features could also be provided.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A handset comprising:
 a housing having a display, a telephone keypad, and a first keypad, the first keypad being removably coupled to the housing;
 circuitry within the housing configured to detect a type of keypad attached to said housing, the circuitry adapted to interface with the display and the first keypad;
 a second keypad, the second keypad exchangeable with the first keypad;
 wherein the second keypad is adapted to replace the first keypad on the housing when the first keypad is removed from the housing and the circuitry detects a first electrical resistance of the first keypad or a second electrical resistance of the second keypad where the first electrical resistance is different than the second electrical resistance; and
 an illumination source, wherein the illumination source illuminates the first or second keypad when the first or second keypad is coupled to the housing and the first keypad at least partially conceals the telephone keypad.

2. The handset of claim 1 wherein the circuitry is adapted to detect whether the first keypad or the second keypad is interfacing with the circuitry.

3. The handset of claim 1 wherein the first keypad has a different number of keys than the second keypad.

4. The handset of claim 1 wherein at least one keypad is at least partially transparent.

5. The handset of claim 1 wherein the first keypad has a larger number of keys than the second keypad and wherein the second keypad has larger keys than the first keypad.

6. The handset of claim 1 wherein the first keypad is adapted to be used with a cordless telephone application and wherein the second keypad is adapted to be used with a game application.

7. A handset comprising:
a housing having a cordless telephone display and a telephone keypad; and
telephone circuitry within the housing configured to detect a type of keypad attached to said housing, the telephone circuitry adapted to interface with the telephone keypad and the cordless telephone display;
a first keypad removably coupled to the housing;
a second keypad, the second keypad exchangeable with the first keypad;
wherein the second keypad is adapted to be removably coupled to the housing when the first keypad is removed from the housing, and the circuitry detects a first electrical resistance of the first keypad or a second electrical resistance of the second keypad where the first electrical resistance is different than the second electrical resistance; and
an illumination source, wherein the illumination source illuminates the first or second keypad when the first or second keypad is coupled to the housing and the first keypad at least partially conceals the telephone keypad.

8. The handset of claim 7 wherein the telephone circuitry is adapted to detect whether the first keypad or the second keypad is interfacing with the telephone circuitry.

9. The handset of claim 7 wherein the first keypad has a larger number of keys than the second keypad and wherein the second keypad has larger keys than the first keypad.

10. The handset of claim 7 wherein the first keypad further comprises a camera interface.

11. A handheld electronic device comprising:
a housing having a device keyboard;
circuitry disposed in the housing configured to detect a type of keypad attached to said housing, the circuitry including a controller programmed to operate the circuitry in accordance with a predetermined characteristic of the electronic device;
a user interface mounted to the housing for interfacing with the circuitry, the user interface being selected from a number of different user interfaces having different predetermined interface characteristics;
wherein the circuitry detects a first electrical resistance of a first keypad or a second electrical resistance of a second keypad where the first electrical resistance is different than the second electrical resistance; and
an illumination source, wherein the illumination source illuminates the first or second keypad when the first or second keypad is coupled to the housing and the first keypad at least partially conceals the device keypad.

12. The device of claim 11, wherein the user interface has a predetermined interface characteristic corresponding to the predetermined characteristic of the device.

13. A handheld electronic device comprising:
a housing having a device keyboard:
circuitry disposed in the housing configured to detect a type of keypad attached to said housing, the circuitry including a controller programmed to operate the circuitry and provide the device with multiple applications;
an interchangeable user interface removably mounted to the housing for interfacing with the circuitry, the user interface being interchangeable with a number of different interchangeable user interfaces with different predetermined characteristics;
wherein the circuitry detects a first electrical resistance of a first keypad or a second electrical resistance of a second keypad where the first electrical resistance is different than the second electrical resistance; and
an illumination source, wherein the illumination source illuminates the first or second keypad when the first or second keypad is coupled to the housing and the first keypad at least partially conceals the device keypad.

14. The device in claim 13, wherein when the interchangeable user interface is interchanged with another of the number of different interchangeable user interfaces the device is changed from a first application to a second application.

15. An apparatus comprising a first keypad for use with a handheld electronic device having a device keypad and electrical resistance measuring circuitry, said keypad comprising a first electrical resistance indicative of the type of the keypad, said keypad being adapted to removably engage said device,
said device further comprising an illumination source illuminating said keypad when said keypad engages said device, and
a second keypad for use with said handheld electronic device, said second keypad comprising a second electrical resistance indicative of the type of said second keypad, said second electrical resistance being different from said first electrical resistance, said second keypad being adapted to removably engage said device, wherein the first keypad at least partially conceals the device keypad.

16. The apparatus of claim 15 further comprising a display.

17. The apparatus of claim 15 wherein the first keypad has a different number of keys than said second keypad.

18. The apparatus of claim 15 wherein at least one of said keypads is at least partially transparent.

19. The apparatus of claim 15 wherein said device comprises a handset.

20. The apparatus of claim 15 wherein the first keypad is adapted to be used with a cordless telephone application and wherein the second keypad is adapted to be used with a game application.

* * * * *